United States Patent [19]

Cherington

[11] Patent Number: 4,479,482
[45] Date of Patent: Oct. 30, 1984

[54] DRAIN LEG ASSEMBLY
[75] Inventor: Floyd E. Cherington, Carrollton, Tex.
[73] Assignee: Lennox Industries, Inc., Dallas, Tex.
[21] Appl. No.: 457,901
[22] Filed: Jan. 14, 1983
[51] Int. Cl.³ .............................................. F24H 3/00
[52] U.S. Cl. ................................. 126/99 R; 137/132; 431/1
[58] Field of Search ............ 126/99 R, 110 R, 116 R; 431/1; 137/132, 590, 590.5, 591, 592; 237/55

[56] References Cited
U.S. PATENT DOCUMENTS

| | | | |
|---|---|---|---|
| 287,179 | 10/1883 | Sexton | 137/132 |
| 355,163 | 12/1886 | Grunsky | 137/132 |
| 2,130,930 | 9/1938 | Rose | 137/132 |
| 2,884,942 | 5/1959 | Caldwell | 137/132 |
| 2,927,600 | 3/1960 | Pellerin | 137/132 |
| 3,216,663 | 11/1965 | Frampton | 137/132 |
| 3,267,985 | 8/1966 | Kitchen | 431/1 |
| 4,040,962 | 8/1977 | Hanford | 137/132 |
| 4,164,210 | 8/1979 | Hollowell | 237/55 |
| 4,194,488 | 3/1980 | Bellaff | 110/160 |
| 4,241,726 | 12/1980 | Kitchen | 431/1 |
| 4,241,874 | 12/1980 | Schossow | 165/DIG. 2 |
| 4,281,625 | 8/1981 | Kasai | 137/132 |
| 4,291,836 | 9/1981 | Chen-Hsiung | 137/132 |
| 4,351,276 | 9/1982 | Kremer | 237/55 |

Primary Examiner—Daniel J. O'Connor
Attorney, Agent, or Firm—Allegretti, Newitt, Witcoff & McAndrews, Ltd.

[57] ABSTRACT

A condensing furnace utilizing a pulsating combustion process discharges flue gas and condensate from the furnace through a flue gas conduit. A drain leg assembly is coupled to the flue gas conduit for effectively separating the condensate from the flue gas, whereby the flue gas is discharged to the flue gas vent and the condensate is discharged to a drain line. The drain leg assembly includes tubular body means having a flue gas outlet at the upper end thereof and means defining a condensate reservoir at the lower end thereof. A vent pipe within the tubular body means and having a bore smaller than that of the tubular body communicates at one end to a condensate outlet means, and the other end of the free end of the vent pipe extends toward the bottom of the tubular body, but is spaced therefrom. The normal level of condensate collected in the tubular body means is above the bottom of the vent tube so as to assure separate discharge of flue gas and condensate from the drain leg assembly.

6 Claims, 3 Drawing Figures

DRAIN LEG ASSEMBLY

BACKGROUND OF THE INVENTION

The present invention relates to a condensing furnace utilizing a pulsating combustion process which furnace discharges flue products consisting of flue gas and condensate through a flue gas conduit and more particularly, this invention relates to a drain leg assembly connected to the flue gas conduit for separating the flue gas and condensate received from the condensing furnace and discharging them separately and independently through a flue gas vent and a drain line, respectively.

The pulsating combustion process has recently been adapted for residential gas fired furnaces. In a pulsating combustion condensing furnace, recently introduced by Lennox Industries Inc. and identified as the G14 series, the combustion process takes place in an enclosed combustion chamber. Basically, gas and air enter the combustion chamber via flapper control valves and mix in the combustion chamber. To start the combustion cycle, a spark is used to ignite the gas and air mixture. Positive pressure from the combustion process within the combustion chamber closes the flapper control valves and forces combustion products (exhaust gas) down a tail pipe extending from the combustion chamber. Exhaust gases leaving the combustion chamber create a negative pressure. This opens the flapper control valves drawing gas and air into the combustion chamber. At the same instance, part of the pressure pulse is reflected back from the tail pipe into the combustion chamber causing the new gas and air mixture to ignite. No spark is needed for the second ignition. The process repeats itself without continued use of the spark plug or purge air blower. The steps of opening the flapper control valves to draw the air/gas mixture into the combustion chambers and of igniting them are repeated 58 to 68 times per second forming consecutive pulses of one-quarter to one-half Btu (British thermal unit) each. Only about 0.0003 cubic feet of natural gas is consumed for each ignition. From the tail pipe, the exhaust gases pass to an exhaust decoupler, which is part of the sound reduction system of the condensing furnace. In the exhaust decoupler, the gases are cooled from about 700° Fahrenheit to 350° Fahrenheit. The exhaust gases from the exhaust decoupler are forced through a condenser coil and are discharged through the flue gas outlet from the condensing furnace. Exhaust gases passing through the condenser coil are cooled by air passing over the coil so that the exhaust gas will leave at a relatively low temperature, such as 100° Fahrenheit or lower. As the temperature of the gases reach dew point (at about 130° Fahrenheit) in the condenser coil, water is condensed from the gases, allowing the furnace to reclaim the latent heat of combustion. High furnace efficiencies in excess of 91 percent can be achieved in condensing furnaces of the type described.

The flue products, which consist of small amounts of spent exhaust gases and condensate are expelled through a flue gas conduit from the condensing furnace. In tests, it has been found that an 80,000 Btu input residential condensing furnace produces approximately five gallons of condensate per day under normal operation in winter. In development of the residential condensing furnace, it was determined that it was necessary to develop means for efficiently and effectively handling the passage of flue gases and condensate from the condensing furnace in separate flow paths. Whereas it was ascertained that condensate could be discharged to a conventional drain, the flue gas could not safely be discharged into a conventional drain or inhabited environs.

An object of the present invention is to provide a drip leg assembly for effectively and efficiently separating the flue gases from the condensate discharged from a condensing furnace.

Another object of the present invention is to provide a drain leg assembly for a condensing furnace, the drain leg assembly being connected to a flue gas conduit means and including a tubular body having inlet means communicating with the flue gas conduit means, flue gas outlet means connected to the flue gas vent and condensate outlet means connected to a drain line, whereby flue gas and condensate are separately discharged from the flue gas vent and the drain line, respectively.

Other objects and advantages of the present invention will become more apparent hereinafter.

BRIEF DESCRIPTION OF THE DRAWING

There is shown in the attached drawing a presently preferred embodiment of the present invention wherein like numerals in the various views refer to like elements and wherein.

DETAILED DESCRIPTION OF THE PRESENT INVENTION

Figure 1:
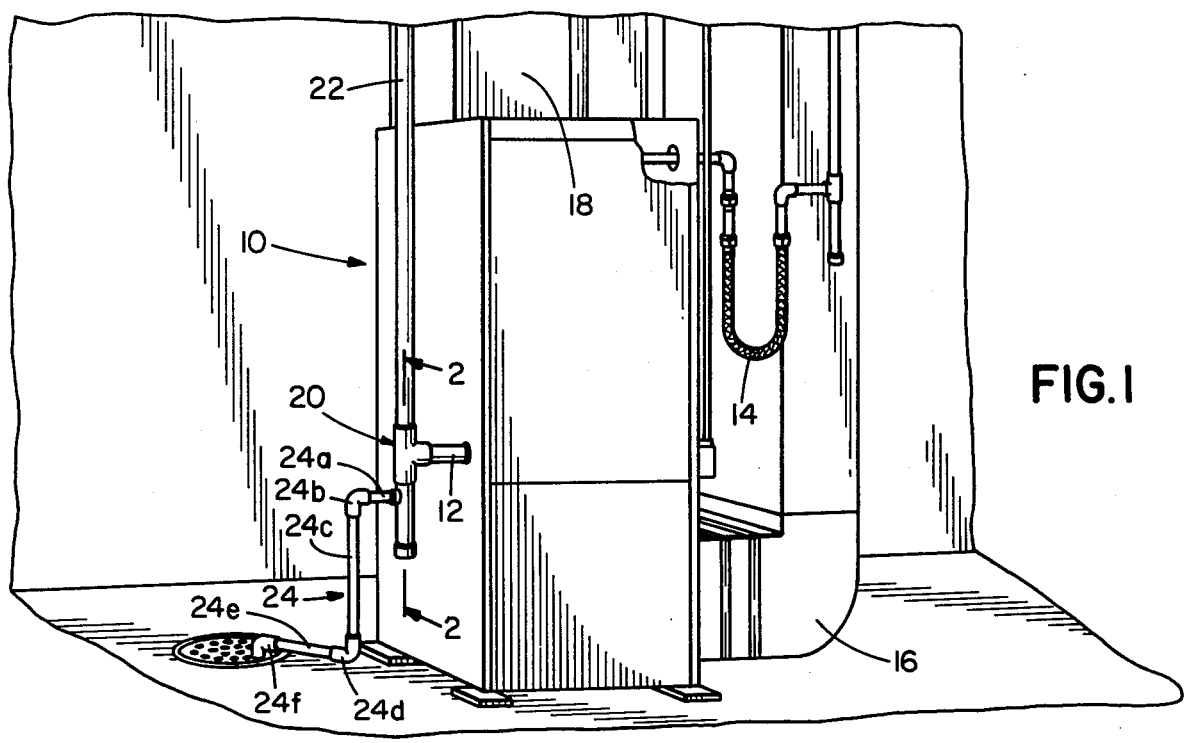
FIG. 1 is a elevational view of a condensing furnace installation, illustrating the drain leg assembly of the present invention attached to the flue gas conduit means from the condensing furnace.

Referring to FIG. 1, there is disclosed a typical condensing furnace installation. The furnace 10 may be disposed in a basement or other appropriate area in a residence or commercial facility to be heated. As previously described, the furnace 10 is of the condensing type, which utilizes a pulsating combustion process. A condensing furnace recently introduced by Lennox Indutries Inc. is identified as the G14 series furnace.

The gas fired condensing furnace 10 discharges flue gas and condensate from the flue gas conduit 12. As shown, the furnace 10 is of the upflow type, wherein room air to be heated passes through a duct 16 to the furnace and heated air is supplied from the furnace 10 to the room to be heated through duct 18. Gas is supplied to the furnace through the conduit 14. If desired, the invention can be adapted to other condensing furnace arrangements, for example, a down flow furnace.

The drain leg or drip leg assembly 20 of the present invention is adapted to be connected to the flue gas conduit 12 for separating the flue gases from the condensate and discharging them separately to a flue gas vent and a drain line, respectively.

Secured to the top of the drain leg assembly 20 is a flue gas vent pipe 22 which may be made from plastic or other suitable material. The flue gas vent pipe 22 is preferably separately vented to the exterior of the building through a side wall or through the roof. The flue gas vent pipe 22 is sealed to the drain leg assembly 20 in a gas tight relationship by utilization of an approved Polyvinyl chloride (PVC) solvent cement. An acceptable standard for sealing the flue gas vent pipe 22 to the drain leg assembly 20 is set forth in ASTM Standard D2855.

Extending downwardly from the drain leg assembly 20 is condensate drain line means 24 that is adapted to be connected to a sanitary drain system or other drain means for discharge of condensate from the drain leg assembly 20. The drain line means 24 shown comprises a stub pipe 24a, an elbow 24b, a pipe 25c, an elbow 25d, a pipe 25e, and an elbow 26f.

Figure 2:
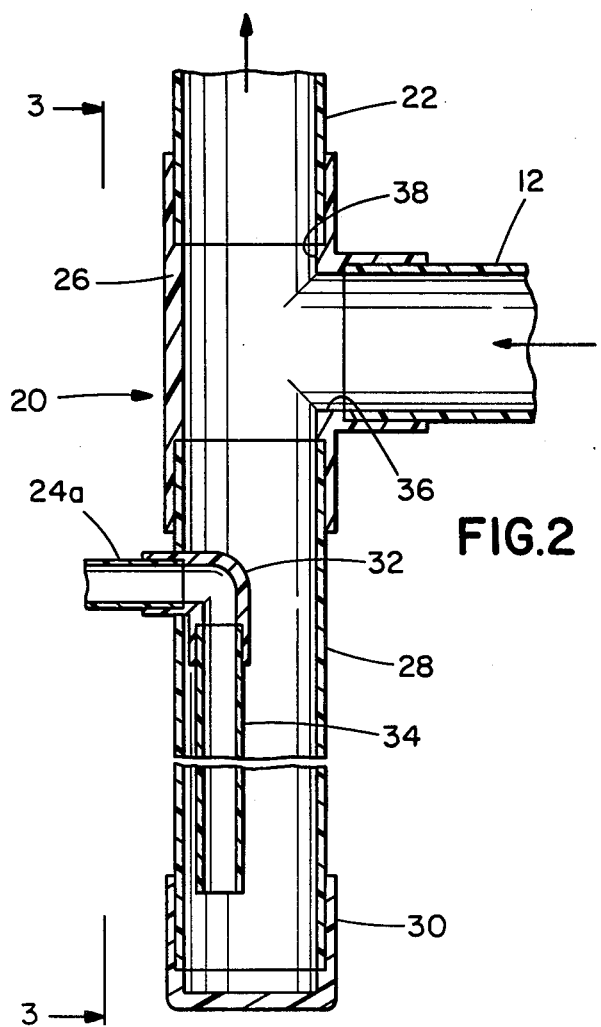
FIG. 2 is a cross-sectional view taken generally along the line 2—2 of FIG. 1.
Figure 3:
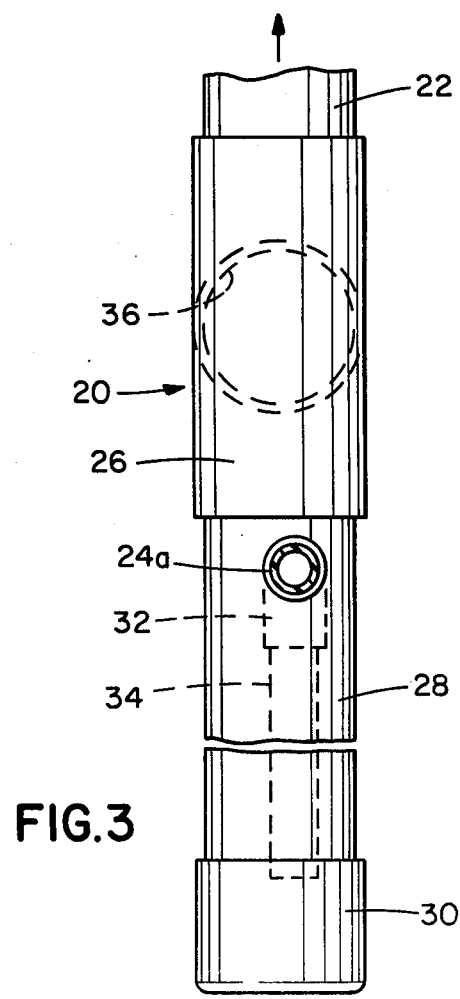
FIG. 3 is an elevational view of the drain leg assembly taken generally along the line 3—3 of FIG. 2.

Referring to FIGS. 2 and 3, there is better illustrated the drain leg assembly 20 of the present invention. The drain leg assembly 20 comprises a tubular body means which includes a tee member 26 connected at the side to the flue gas conduit 12 from the furnace, connected at the top to the flue gas vent pipe 22 and connected at the bottom to a pipe member 28 which is closed at the bottom by a cap 30. An elbow 32 is connected to an opening in the pipe member 28. The elbow 32 is connected in gas-tight relationship to the drain pipe 24, and the opposite end of the elbow 32 is connected to a vent pipe 34 which extends into the pipe member 28, but is spaced from the bottom thereof. The diameter or cross sectional area of vent pipe 34 is substantially less than the diameter or cross sectional area of the pipe member 28.

The arrangement of inlet and outlets in the tubular body means are important to obtain the desired result of separating the flue gas from the condensate so that the condensate can be safely discharged into a drain or sanitary sewer system and the flue gas can be safely vented from the living or inhabited space and discharged outside the home. The top of the inlet 36 is at or below the bottom of the flue gas outlet 38. Condensate outlet means are defined in the end of the elbow 32 opposite from the end connected to vent pipe 34. The condensate outlet means is below the inlet 36.

In operation, an 80,000 Btu input pulsating combustion condensing furnace will produce about five gallons of condensate per day in wintertime operation. As noted, the flue gas and condensate will pass from the furnace through the flue gas conduit 12. The flue gas will pass through the inlet 36 of the drain leg tubular body means and be discharged from the outlet 38 at the top of the tubular body means to the flue gas vent pipe 22. Condensate will fall by gravity and be collected in the reservoir defined in the tubular body member by the pipe member 28 and cap 30. The normal level of condensate will be above the bottom of the vent pipe 34 and consequently, the discharge of the flue gas through the flue gas vent pipe 22 will be effectively separated from the discharge of condensate through the drain line 24. If a drain outlet is not convenient, a small pump can be used to communicate the condensate to a suitably located drain. The flue gas vent pipe 22 operates under positive pressure and is competely sealed as to prevent the leakage of combustion products into the living or inhabited space. The flue gas vent pipe 22 will extend separately to an outside wall, or if there is vertical discharge through an existing but unused stack or duct, the vent pipe will be inserted inside the stack until the top end is at least even with the top or outlet end of the stack.

There has been provided by the present invention an effective drain leg or drip leg assembly which efficiently and safely separates the flue gas and condensate discharged from a common outlet from the condensing furnace for separate discharge through a flue gas vent pipe and a condensate drain line. Preferably the parts of the drain leg assembly or drip leg assembly are fabricated from corrosion resistant material, such as polyvinyl chloride (PVC). All joints are gas tight. If desired, the tubular body means of the drain leg assembly may be molded or otherwise fabricated as one part.

Research has shown that the condensate is mildly acidic and has a pH from 3.5 6.5. For reference, many fruits, soft drinks and wine exhibit similar pH levels. The condensed water vapor from the furnace may contain small amounts of sulfuric, nitric or carbonic acid, depending upon the constituents in the fuel being burned.

Normal household waste water tends to be alkaline (on the high side of the pH of 7.0). The combined effluent, waste water, and condensate from the furnace would approach a neutral pH, while dilution would further weaken the strength of the solution.

Research studies indicate that when the furnace condensate is combined with the effluent (which is basically alkaline) from a typical residence, the combined discharge from the household is above a pH of 4.5, eighty percent of the time. Standard drainage and sewage system materials show no increase in corrosion rate when exposed to the combined flow, as compared to the normal effluent flow. The condensate is not harmful to standard household plumbing and can be drained into city sewers and septic tanks without damage.

While we have shown presently preferred embodiment of the present invention, it will be understood that modifications may be embodied within the scope of the following claims.

We claim:

1. In a condensing furnace for heating an environment utilizing a pulse combustion process and having flue gas conduit means for discharging flue gas and condensate from the furnace, the improvement comprising a drain leg assembly connected to the flue gas conduit means, said drain leg assembly including tubular body means having inlet means communicating with the flue gas conduit means, flue gas outlet means connected to a flue gas vent for discharging flue gas exterior of the environment, condensate outlet means connected to a drain line for discharging condensate separate from the flue gas, said flue gas outlet means being at the same height as or above the inlet means, said condensate being collected in the lower portion of the tubular body means, said condensate outlet means being below the inlet means, and a vent pipe communicating at one end to the condensate outlet means, the free end of said vent pipe extending toward the bottom of the tubular body means, but spaced from said bottom, whereby condensate collected in the tubular body means may be discharged through the vent pipe and condensate outlet means.

2. A drain leg assembly as in claim 1 fabricated entirely from corrosion resistant material.

3. A drain leg assembly as in claim 2 wherein the corrosion resistant material is plastic.

4. A drain leg assembly as in claim 1 fabricated entirely from PVC plastic.

5. In a condensing furnace for heating an environment utilizing a pulse combustion process and having flue gas conduit means for discharging flue gas and condensate from the furnace, the improvement comprising a drain leg assembly connected to the flue gas conduit means, said drain leg assembly including tubular body means having inlet means communicating with the flue gas conduit means, flue gas outlet means connected to a flue gas vent for discharging flue gas exterior of the environment, condensate outlet means connected to a drain line for discharging condensate separate from the flue gas, said flue gas outlet means being at the same height as or above the inlet means, said condensate being collected in the lower portion of the tubular body means, said condensate outlet means being below the inlet means, a vent pipe connected at one end to the condensate outlet means, with the free end of the vent pipe being disposed within the tubular body means in spaced relationship to the bottom of the tubular body means, but below the normal level of condensate collected in the tubular body means during operation of the condensing furnace, whereby flue gas is discharged exterior of the environment through the flue gas outlet means to the flue gas vent and condensate is discharged through the condensate outlet means to the drain line.

6. In a condensing furnace for heating an environment utilizing a pulse combustion process and having flue gas conduit means for discharging flue gas and condensate from the furnace, the improvement comprising a drain leg assembly connected to the flue gas conduit means, said drain leg assembly including tubular body means having inlet means communicating with the flue gas conduit means, flue gas outlet means connected to a flue gas vent for discharging flue gas exterior of the environment, and condensate outlet means connected to a drain line for discharging condensate separate from the flue gas, said tubular body means comprising a tee body and a drain leg pipe connected to said tee body, said inlet means being in a side of the tee body, said flue gas outlet means being at the top of said tee body, said drain leg pipe being connected at the bottom of said tee body and said condensate outlet means being in said drain leg body, said tubular body means comprises a tee body and a drain leg pipe connected to said tee body, said inlet means being in a side of the tee body, said flue gas outlet means being at the top of said tee body, said drain leg pipe being connected at the bottom of said tee body, and said condensate outlet means being in said drain leg pipe.

* * * * *